July 28, 1964 P. J. PINGON 3,142,395
MACHINES FOR PUBLIC WORKS
Filed Nov. 13, 1961 7 Sheets-Sheet 1

INVENTOR
PIERRE JOSEPH PINGON
BY Irwin N. Thompson
ATTY.

July 28, 1964

P. J. PINGON 3,142,395

MACHINES FOR PUBLIC WORKS

Filed Nov. 13, 1961

INVENTOR
PIERRE JOSEPH PINGON
BY Irwin S. Thompson
ATTY.

July 28, 1964

P. J. PINGON 3,142,395

MACHINES FOR PUBLIC WORKS

Filed Nov. 13, 1961

INVENTOR
PIERRE JOSEPH PINGON
BY Orwin S. Thompson
ATTY.

July 28, 1964 P. J. PINGON 3,142,395
MACHINES FOR PUBLIC WORKS
Filed Nov. 13, 1961 7 Sheets-Sheet 7

Fig. 14

INVENTOR
PIERRE JOSEPH PINGON
BY Irwin S. Thompson
ATTY.

United States Patent Office 3,142,395
Patented July 28, 1964

3,142,395
MACHINES FOR PUBLIC WORKS
Pierre Joseph Pingon, 5 Ave. du Parmelan,
Annecy, Haute Savoie, France
Filed Nov. 13, 1961, Ser. No. 152,963
Claims priority, application France Nov. 24, 1960
12 Claims. (Cl. 214—138)

The present invention relates generally to public works machines and is more particularly directed to a ground-working machine such as a full revolving power operated shovel or the like having wheels provided with pneumatic tires.

Such machines are attractive due to their high mobility but known constructions of such machines present various disadvantages. Generally speaking, the centre of gravity of such machines is too high and their bulk volume heightwise is relatively large owing to the fact that the revoluble parts which carry the working tools are moved above the pneumatic tires of the wheels, the height of which is considerably larger than that of caterpillars of the conventional type. Moreover, while the machine is operating, for example as a power operated shovel, it is necessary to compensate for the flexibility of the pneumatic tires by means of jacks or shoes abutted against the ground. Besides, difficulties are often encountered when making up the transmission gears and the control unit between the rotary part and the frame. Attempts made for solving this mechanical problem proved to be imperfect and expensive. Finally, while such machines generally include all the members provided in a tractor and often four propelling wheels, they cannot be utilized as such owing to their bulkiness and the high level of their centre of gravity.

It is an object of the invention to remedy the aforesaid disadvantages and to provide an improved machine for multiple uses equipped with full revolving tools, said machine being of reduced size and so constructed as to avoid those transmission difficulties which are generally encountered.

Another object of the invention is to provide a machine for public works fitted with wheels provided with pneumatic tires forming a ground-working machine such as a full revolving power operated shovel and comprising a main body, arms hinged to said body and carrying the machine wheels, a platform arranged under said body so that the latter can be rotated with respect to it, members for performing motion of said hinged arms so as to cause the machine selectively to rest upon the ground either by said wheels or by said platform, and a power unit fitted upon the rear portion of said main body which carries a working equipment such as a shovel, a crane or a bulldozer.

Assuming the machine to rest upon the ground by its wheels, the power unit permits it to be propelled on a road or highway and may be selectively connected to the wheels for steering purposes. When the platform has been brought down into contact with the ground by lifting the wheels, the power unit is connected to the revolving or orientating system of the machine and permits the main body to be rotated by 360° together with the power unit and the ground-working equipment. Thus the mechanisms used for propelling the machine may be utilized for revolving purposes when work has to be carried out on the ground.

A relatively very low machine is thus provided having reduced overall size (similar to that of a tractor of equal horse power) capable of being strongly abutted to the ground when operating as a shovel and providing the combined possibilities of a tractor and a machine such as a power operated shovel, the control of this machine being performed in very simple fashion since a pair of control blocks impart a translational motion, a steering motion and a revolving motion to the machine.

With these and such other objects in view as will incidentally appear hereafter, the invention comprises the novel construction and combination of parts that will now be described with reference to the accompanying drawing exemplifying the same and forming a part of the present disclosure.

Figure 1:
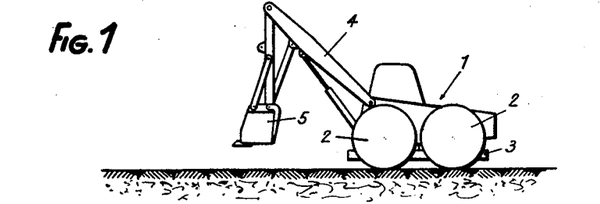
FIGURES 1 to 4 illustrate various possible uses of the improved machine according to the invention.

In the showing of FIGS. 1 to 4 are illustrated several possible uses of the machine according to the invention. As shown by FIG. 1, the machine which is designated in its entirely by 1 is movable along the ground thanks to its wheels 2, its platform 3 being maintained off the ground, the machine being equipped so as to work as a power opearted shovel and comprising a jib 4 and a bin 5.

Figure 2:
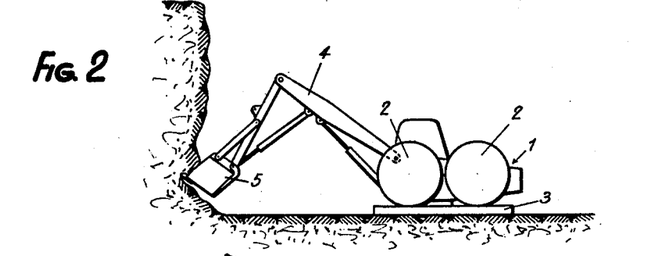
Figure 3:
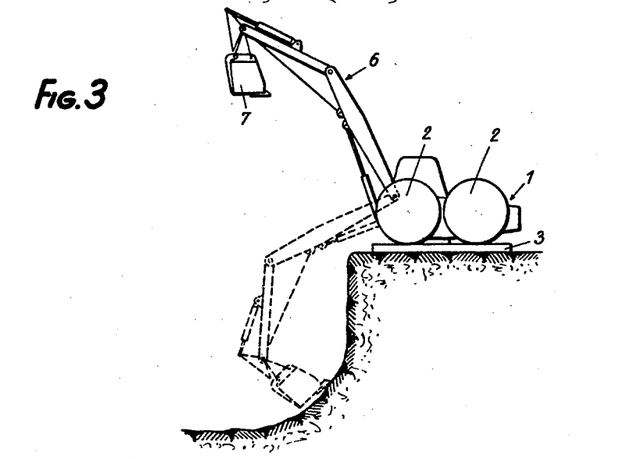

In the showing of FIG. 2, the machine is assumed to have been put into service by lifting its wheels 2 off the ground. Proper stability is then obtained. It will be seen that the machine adapted to operate as a power operated shovel attacks a bank of ground upwardly. The reverse position is shown in FIG. 3 in which the jib is designated by 6 while the bin is designated by 7.

Figure 4:
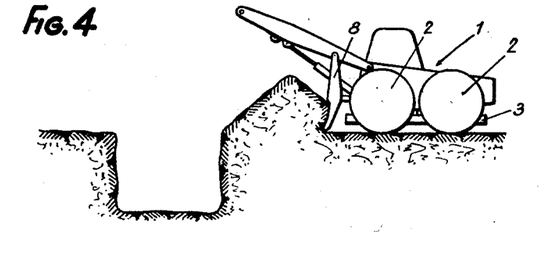

In FIG. 4, the machine 1 is equipped with a bulldozer blade 8. The wheels 2 are shown in their sunk position i.e. in contact with the ground so as to lift the platform 3 from it, thereby enabling the machine to be movable.

Figure 5:
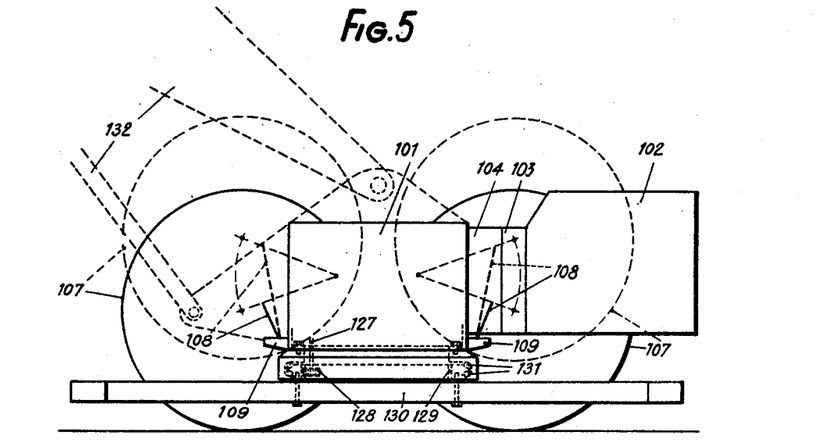
FIGURE 5 is a diagrammatic elevational view of a machine built according to the invention by way of constructional example.
Figure 6:
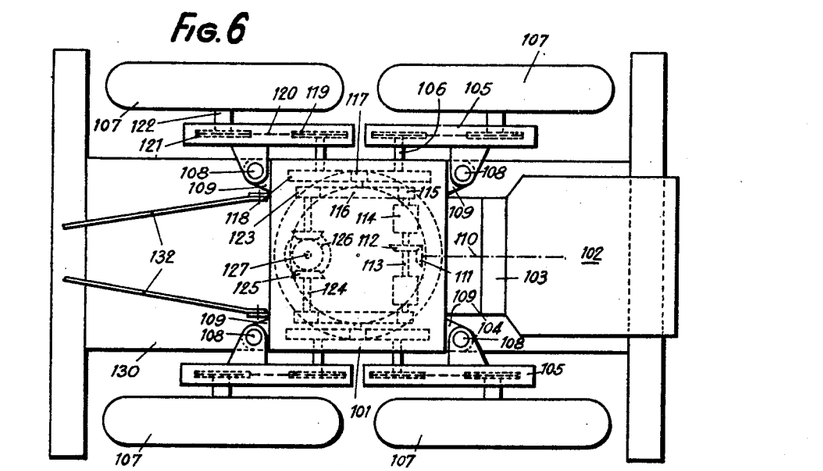
FIGURE 6 is a top plan view corresponding to FIG. 5.
Figure 7:
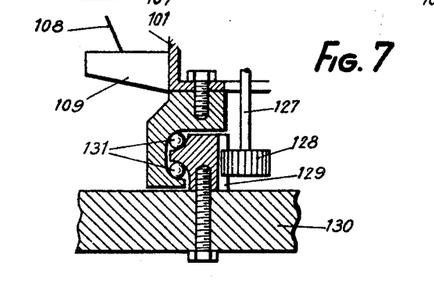
FIGURE 7 is a detail view.

The machine shown in FIGS. 5 to 7 comprises a main body 101 to one side of which is fitted an internal combustion engine 102 operatively connected thereto by a primary clutch 103 and a gear box 104. Supporting arms 105 are hinged by pins 106 to the main body 101 and carry the wheels 107 which are provided with pneumatic tires. The positions of the arms 105 may be adjusted heightwise by jacks 108 interposed between the arms 105 and brackets 109 carried by the main body 101. In the showing of FIG. 5 are illustrated respectively in full lines and in dotted lines the two end positions of the wheels 107.

In the constructional form shown here, the four wheels operate to propel the machine and are driven by the following mechanisms: The output shaft 110 of the gear box 104 carries a bevel gear 111 which meshes with another bevel gear 112 keyed to or fast upon a transverse shaft 113 in the length of which are interposed a pair of secondary clutches 114. The output shaft of each of these clutches carries a spur pinion 115 forming the first element of two transmissions mounted in parallel which are actuated either selectively or jointly. Each pinion 115 meshes with a toothed wheel 116 fast upon a pinion 117 which meshes with a pair of toothed wheels 118 keyed upon the hinge pins 106 of the arms 105. Said pins carry inside the arms 105 sprockets 119 connected by chains 120 to other sprockets 121 keyed to the shafts 122 of the wheels 107.

The toothed wheels 116 mesh with other pinions 123 fast upon shafts 124 carrying bevel gears 125 which are adapted to engage a bevel crown gear 126 splined on a fluted vertical shaft 127. This gear 126 may be slid along the shaft 127 for being brought into engagement with the bevel gears 125 or disengaged from them responsive to the action of a jack or like device (not shown) coupled to the jacks 108.

The shaft 127 projects downwardly from the main body 101 and carries a pinion 128 (see FIG. 7) which meshes with a crown gear 129 fast upon a platform 130 of large size. The main body is revolubly supported with respect to the platform by means of a double ball thrust bearing designated generally by 131 and adapted to support the platform 130 off the ground when the wheels 107 rest upon it.

At 132 is diagrammatically shown the jib of a movable crane, a power operated shovel or an analogous device operatively connected as shown to the main body 101.

The operation of the machine takes place as follows: When it is used as a tractor, its wheels 107 occupy their lower position shown in full lines in FIG. 5. The platform 130 is then held at a small distance from the ground. The main body 101 and the power unit or engine 102 as well as the associated members or devices are then situated between the wheels 107 so that the centre of gravity of the tractor is very low and the machine has a high stability for motion on a road.

When the two clutches 114 are engaged, the four wheels are driven and the tractor moves rectilinearly. Declutching of one of them permits the tractor to be steered either to the left or to the right by braking the wheels situated on one side of the tractor.

When the machine must operate for example as a power operated shovel on the working site, the jacks 108 are so actuated as to move the wheels 107 upwardly, thereby causing a relative lowering of the platform 130 which comes into contact with the ground. The wheels 107 are then lifted off the ground and assume the position shown in dotted lines in FIG. 5. The operative connection between the engine and the wheels continues to be ensured. In such a position, the machine has a high degree of stability owing to adequate dimensions of the platform 130, and here again the centre of gravity is very low. When the wheels 107 are raised, the conical crown gear 126 is slid along its shaft 127 and brought into engagement with the bevel gears 125.

It follows that selective engagement of either the one or the other of the secondary clutches 114 permits (owing to the provision of the pinion 115, toothed wheel 116, pinion 123, shaft 124 and associated pinion 125, also owing to the provision of the conical crown gear 126 and the shaft 127) the rotation of the pinion 128, which thus rolls along the inner teeth of the crown gear 129 rigid with the platform 130. This causes rotation upon the double ball bearing 131 of the assembly made up of the main body 101, the engine 102, the wheels 107 and the working equipment 132, also of course of the associated ancillary members.

When revolving comes to an end, the two clutches 114 are disengaged and the wheel brakes are applied, thereby ensuring an angular locking of the aforesaid assembly on the platform owing to the bevel gears 125 being operatively connected to the wheels by the two transmissions arranged in parallel.

Figure 8:
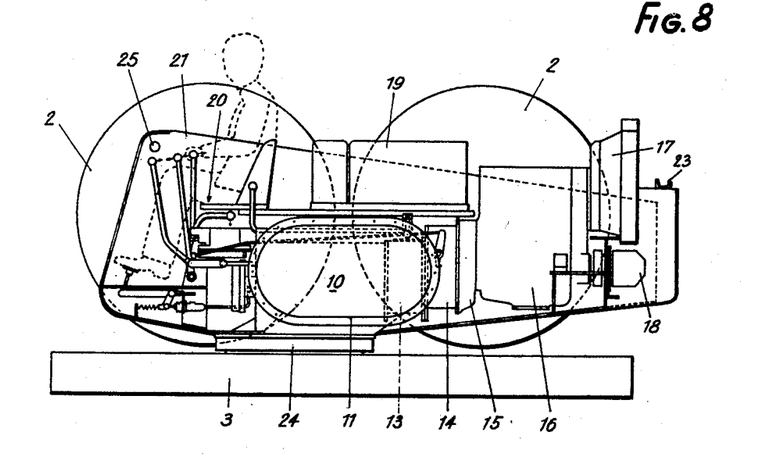
FIGURE 8 is an elevational view of another constructional form of the machine, assuming the working tools to be omitted.
Figure 9:
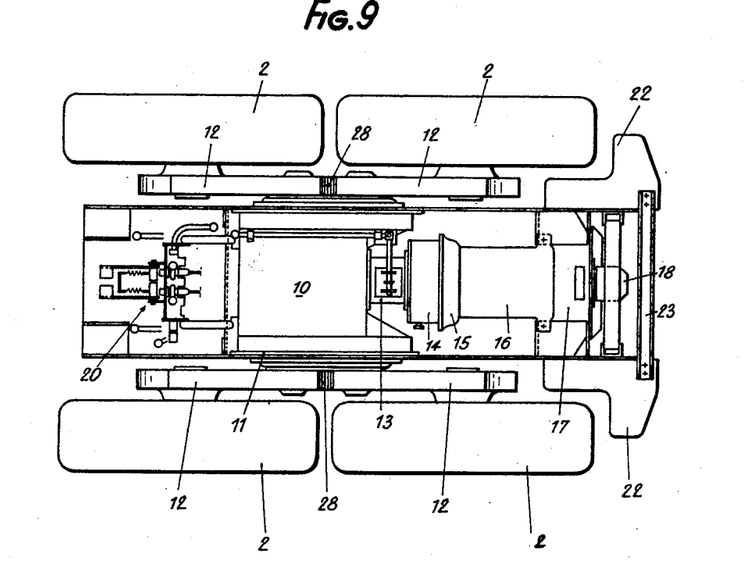
FIGURE 9 is a corresponding plan view.

As visible for the constructional embodiment of the invention shown in FIGS. 8 and 9, the machine comprises a main body designated generally by 10 which is described hereafter.

The main body 10 is provided on both sides with hinged arms 12 on which are mounted the wheels 2 of the machine as described hereafter. The main body 10 is also provided rearwardly and in the indicated sequence with a gear box 13, a main clutch 14, a flywheel 15, an engine 16 (for example of the internal combustion type), a fan 17 associated with said engine and an oil pump 18. The main body 10 is surmounted by a pair of tanks 19 which respectively contain oil and gas oil and a driver cabin or station designated in its entirety by 20 and provided at the front end of said main body as shown in the drawing. At 21 is indicated the outline of the machine casing or cladding. It will be seen that a machine of compact structure is obtained.

The assembly also comprises in the present case ballast masses 22 arranged in the rear part of the machine and connected by a cross beam 23.

In FIG. 8, the wheels 2 of the machine are shown in raised position so that the machine is abutted upon the ground by the platform 3 (which may have a H shape) for giving the machine maximum stability. A connection permitting an angular motion is performed between the main body of the machine and the platform 3 by a ring of balls or rollers designated in their entirety by 24 in FIG. 8.

It will be easily seen from an examination of FIGS. 8 and 9 that the machine is made up of two sharply separate parts, namely a platform 3 and a composite assembly including the main body 10 to which all the other elements of the machine are connected, said body forming with the several elements and the cladding 21 a chassis which is pivotally connected to the platform by the crown gear 24.

The working tools are carried by this chassis and may be fitted for example at 25 (FIG. 8) in a part of said chassis. Such tools may be actuated conventionally by cables or by hydraulic means.

Figure 10:
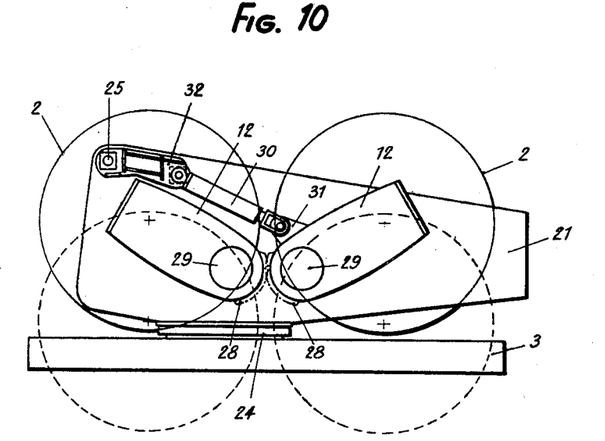
FIGURE 10 is a diagrammatic elevational view showing the means for controlling the wheel arms.

In the showing of FIG. 10 is shown the way in which the wheels 2 may be moved with respect to the remainder of the machine so as selectively to assume either the raised position shown in full lines in FIG. 10 in which the machine rests upon the ground by the platform 3 for ensuring adequate stability during the work or the position shown in dotted lines in which the wheels rest upon the ground, for example for moving the machine.

The wheels are supported on each side of the machine by arms 12 mounted upon its body through the medium of web plates 54 recessed to that effect. Said arms 12 are held by ring members 55 connected to the arms by a series of bolts 56. Thus guided, the arms may be rocked and are provided with intermeshing toothed sectors 28 so that on one side of the machine thet rocking motions of both arms are correlated. A jack 30 engaging an arm 12 by a lug 31 and connected at its other end to a stationary point 32 of the machine frame is provided on both sides of the latter. It will be easily understood that control of said jack 30 permits the two wheels situated on one and the same side of the machine to be selectively raised and lowered. As shown by FIG. 10, the jack 30 is fixed to the machine frame at a position 32 which is situated opposite to the arm 12 engaged by the jack. There is thus obtained for the jack 30 a small degree of slant relative to the horizontal so that the jack is entirely housed in the overall outline of the casing 21 and does not project over it, thereby still reducing bulkiness.

Figure 11:
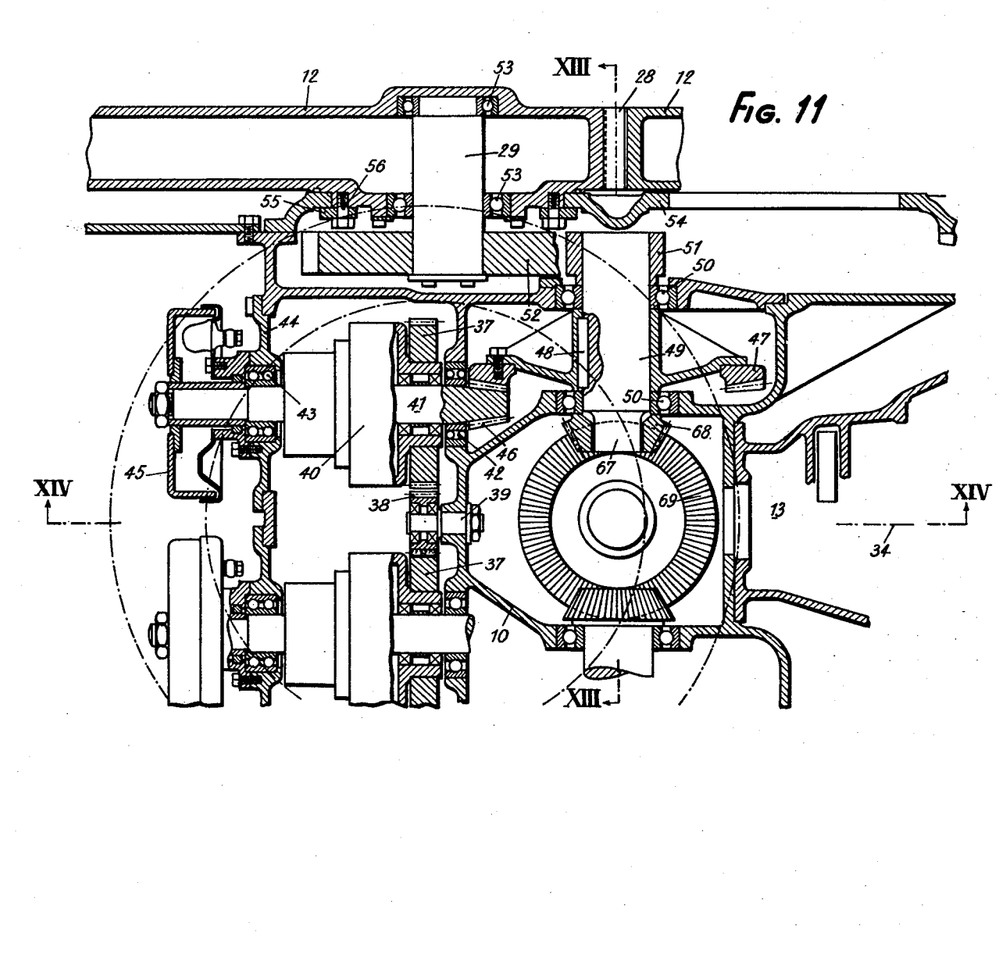
FIGURE 11 is a partial plan view of the machine body.
Figure 14:
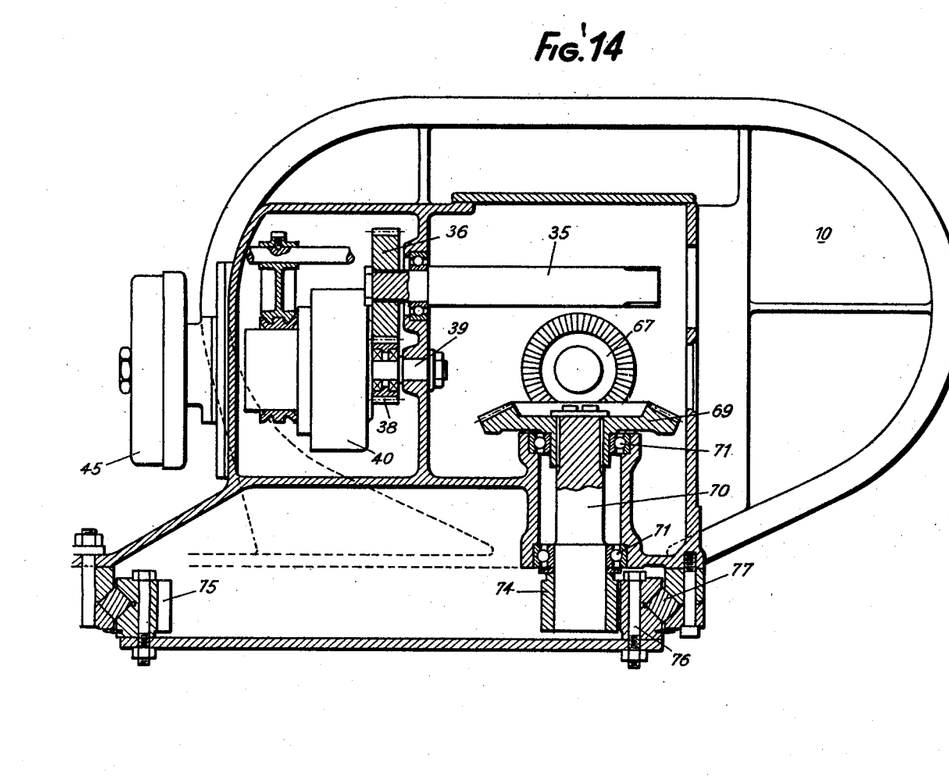
FIGURE 14 is a fragmentary plan view in vertical section on the line XIV—XIV in FIG. 11.

Reference will now be made to FIG. 11 in which is shown in horizontal section the assembly of chief elements accommodated in the machine body. At 34 is indicated in dot and dash lines the axis of the output shaft of the power unit which includes the gear box 13, the main clutch 14 and the engine 16 of the machine. The end portion of the output shaft of the engine is designated by 35 in FIG. 14. It will be seen that said shaft 35 carries at its front end a pinion 36 which is in direct engagement with a pinion 37 the function of which will be indicated hereafter while it engages on the other side another pinion 37′ through the medium of a reverse pinion 38 mounted idly upon a stub shaft 39 carried by the main body 10 of the machine.

Owing to the reverse pinion 38, identical directions of rotation are obtained for the two side transmission units which are arranged on the opposite sides of the middle longitudinal axis of the machine and which will now be described. Considering that these transmission units are identical, it will be sufficient for one of them to be described. The pinion 37 is operatively connected to a clutch casing 40 which may be of any suitable type and which performs a selective angular interconnection of the pinion 37 with a side shaft 41 extending parallel to the longitudinal axis of the machine. Said shaft 41 is journalled through bearings 42 and 43 in the main body 10 of the machine and in a partition 44 mounted upon the front part of said body, and it projects forwardly beyond the partition 44 and carries a brake 45 which may be of any appropriate type, thereby permitting either an angular locking of the shaft 41 or a braking effect of said shaft following disengagement of the clutch 40 to be achieved.

Figure 12:
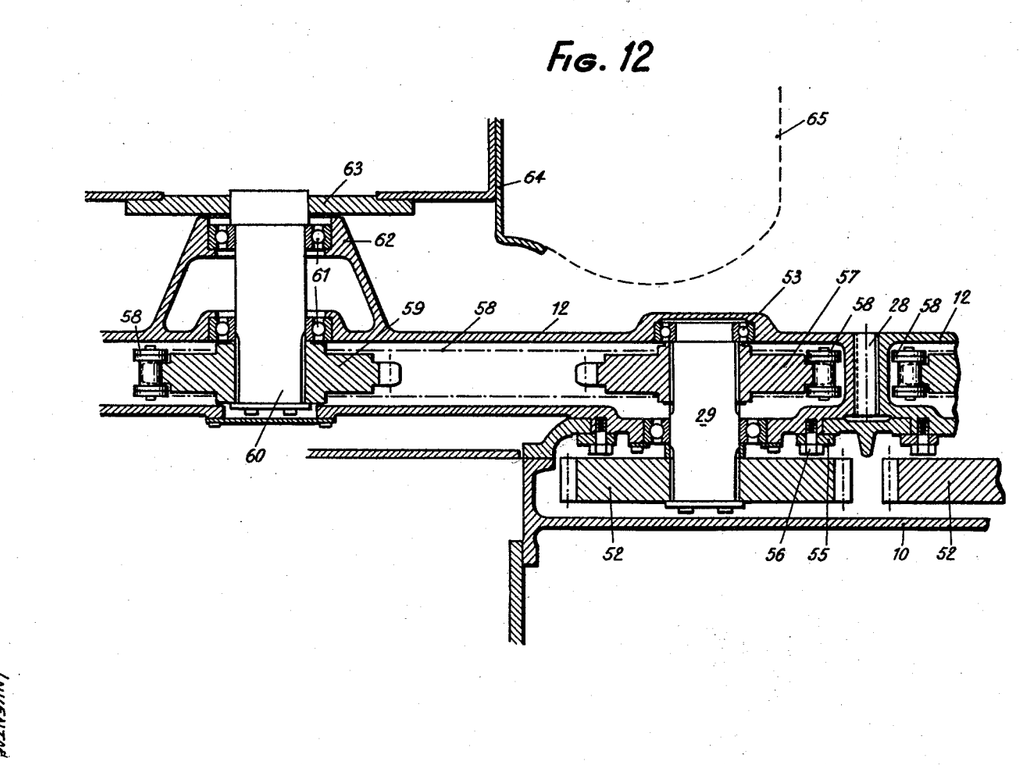
FIGURE 12 is a partial plan view showing the wheel-control means.
Figure 13:
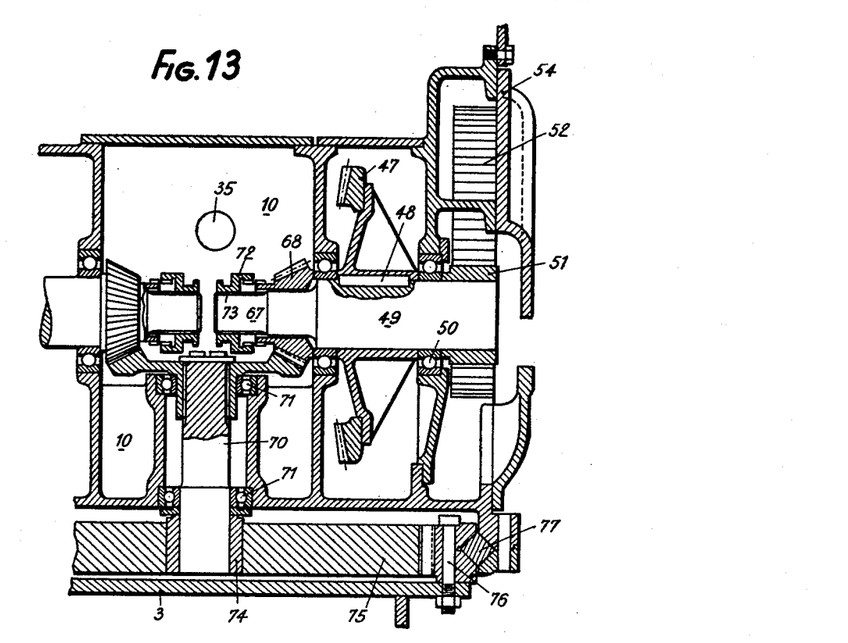
FIGURE 13 is a fragmentary view in vertical section on the line XIII—XIII of FIG. 11.

Each side shaft 41 carries at its rear end inside the main body 10 a bevel gear 46 in mesh with a conical crown gear 47 keyed at 48 to a transverse shaft 49 journalled at 50 in the main body of the machine. Said shaft 49 terminates outwardly in a spur gear 51 of small diameter which meshes with side pinions 52 of larger diameter as shown by FIGS. 11, 12 and 13. Each pinion 52 is keyed for joint angular motion to a shaft 29 mounted upon the oscillation axis of the wheel-carrying arms and journalled in the latter as shown at 53.

As indicated in FIG. 12, each shaft 29 carries inside the associated arm 12 a sprocket wheel 57 connected by a sprocket chain 58 to another sprocket wheel 59 keyed upon an end shaft 60 journalled at 61 in the flared tube 62 rigid with the arm 12. At its outward end the shaft 60 carries a wheel web plate 63 which jointly with the rim 64 and the pneumatic tire 65 form one wheel 2 of the machine.

The transverse shaft 49 extends inwardly of the main body 10 in the form of a journal 67 on which is mounted for idle rotation a bevel gear 68 which meshes with a conical crown gear 69 keyed upon a vertical shaft 70 which (as shown by FIG. 13) is journalled in bearings 71 in the main body 10 of the machine.

Dog or sliding gear couplings 72 are slidably mounted upon the trunnions 67 which are extended to that effect by means of suitable flutes. Said couplings 72 are associated with control means (not shown) which may be advantageously constituted by side hydraulic members 30 which lift the wheels off the ground for clutching up the couplings 72 with the bevel gears 68 i.e. for connecting up said gears 68 with the shafts 49 when the wheels are raised.

The vertical shaft 70 carries at its lower end a small pinion 74 which meshes with a crown gear 75 operatively connected by means of bolts 76 with the platform 3 as shown in FIG. 13. A large diameter bearing comprising alternate rollers 77 is provided between the platform 3 and the main body 10 of the machine as indicated by FIG. 13.

The operation and method of utilizing the aforesaid machine are as follows:

For moving the machine on a road, the wheels 2 are in lowered position so that the platform 3 is moved off the ground as shown by FIG. 1. Energy is then transmitted from the power unit fitted at the rear end of the main body 10 to the shaft 35 and then through the pinions 37, 37', the clutches 40 in coupled position, the shafts 41, the bevel gears 46, the crown gears 47, the shafts 49, the pinions 51 and 52, the shafts 29, the sprocket wheels 57, the sprocket chains 58, the sprocket wheels 59 and the shafts 60 to the machine wheels 2. For propelling the machine rectilinearly, the two clutches 40 are actuated. When it is desired to steer the machine, it is only sufficient to uncouple one of the clutches 40 and eventually to actuate the corresponding braking device 45. Following this, the propelling energy ceases to be transmitted on one side of the machine and the motion of the wheels situated on that side may be slowed down by a braking stress so that the machine can be steered. It will be noticed that control of the clutches 40 and of the brakes 45 is rendered particularly easy owing to the fact that such clutches and brakes are situated at the front end of the machine almost under the driver's cabin 20.

For starting the operation of the machine, for example as a power operated shovel, the wheels 2 must be raised by actuating the hydraulic jacks 30 which are situated on each side of the machine. As stated in the foregoing, this actuation of the hydraulic jacks also actuates the couplings or sliding gears 72, thereby interconnecting the shafts 49 and bevel gears 68 for joint angular motion. In operating position, the platform 3 rests upon the ground as indicated by FIGS. 2 and 3 and the wheels 3 are raised. This relative position is also indicated by FIGS. 8 and 10. For properly orientating the working tools, it is only sufficient to actuate the clutches 40. Consequently the control from the power unit is transmitted to the two transverse shafts 49 and through the pinions 68 that are now operatively connected to said shafts to the crown gear 69. The latter drives the vertical shaft 70 which rolls inside the crown gear 75 rigid with the platform 3. This motion of the gear causes rotation of the chassis assembly about the crown gear 75–24 and therefore around the platform 3. It will be readily seen for example from an examination of FIG. 8 that the orientation of the machine frame may freely take place over 360° right round the crown gear designated generally by 24 in FIG. 8. Obviously control of the one or the other of the clutches 40 provides orientating or revolving motion in the one or the other direction and either of the brakes 45 can stop said motion.

The controls of the clutches, brakes, jacks and couplings or sliding gears 72 may be of any approved type but as they form in themselves no part of the invention, they are not described in detail in the present specification.

Minor constructional details of the machine may be varied without departing from the scope of the following claims within the ambit of technical equivalencies.

What is claimed is:

1. A machine for public works mounted on wheels fitted with pneumatic tires comprising a main body, arms hinged to said main body, the wheels being mounted upon said arms, a platform arranged under the main body, jacks interposed between said arms and main body, a fluid circuit for controlling said jacks so as to cause the machine to rest upon the ground selectively either by said platform or by said wheels, an orientating gear interposed between said main body and said platform, an engine mounted at the rear end of the main body, a working equipment mounted adjacent the front end of the main body, a multipart transverse shaft mounted inside said main body, a primary clutch and a gear box mounted between said transverse shaft and said engine, secondary clutches interposed in said transverse shaft, said secondary clutches being connected to the machine wheels, and a branched connection interposed between said secondary clutches and the orientating gear.

2. A machine for public works mounted on wheels fitted with pneumatic tires according to claim 1 comprising a pair of transmissions mounted in parallel relation and provided between said secondary clutches and the wheels, and means for breaking the branched connection when the machine rests upon the ground by its wheels and conversely for reestablishing said branched connection when the machine rests upon the ground by its platform.

3. A machine for public works mounted on wheels fitted with pneumatic tires comprising a main body, arms hinged to said body, the machine wheels being mounted upon said arms, a platform extending under the main body, jacks interposed between said arms and said main body, a fluid circuit for the control of the jacks, said jacks selectively displacing said arms vertically so that the machine will rest upon the ground either by its wheels or by said platform, an orientating gear interposed between said main body and said platform, a power unit fitted near the rear end of the main body, a working equipment fitted near the front end of said main body, and a pair of control assemblies mounted in parallel relationship each made up of a clutch and a brake and each arranged between the power unit and the wheels and orientating gear.

4. A machine for public works mounted on wheels fitted with pneumatic tires according to claim 3 comprising control means for the selective actuation of the clutch or brake of each control assembly.

5. A machine for public works mounted upon wheels fitted with pneumatic tires comprising a main body, a pair of arms hinged to each longitudinal side of the main body, the pivot axes of each pair of arms being parallel and adjacent one another, the machine wheels being fitted upon said arms, toothed sectors carried by said arms, the toothed sectors of both arms arranged on the same side of the main body being in intermeshing relation, a platform extending under the main body, a jack provided on each side of the main body and interposed between one of the arms and the main body, a fluid circuit for the simultaneous control of both jacks so as to cause the machine to rest upon the ground selectively either by said platform or by said wheels, an orientating gear interposed between said main body and said platform, a power unit arranged near the rear end of the main body, a working equipment arranged near the front end of the main body, and a pair of control assemblies arranged in parallel relationship and each made up of a clutch and a brake and each fitted between the power unit and the wheels and orientating gear.

6. A machine for public works mounted on wheels fitted with pneumatic tires according to claim 5 in which each jack is interposed between one of the arms and a position of the main body adjacent the other arm.

7. A machine for public works having wheels fitted with pneumatic tires according to claim 5 comprising control means for the selective actuation of the clutch or brake of each control assembly.

8. A machine for public works having wheels fitted with pneumatic tires comprising a main body, a pair of arms hinged to each longitudinal side of said main body, the machine wheels being mounted upon said arms, a platform arranged under the main body, jacks arranged between said arms and the main body, a fluid circuit for the simultaneous control of said jacks which selectively displace said arms vertically and cause the machine to rest upon the ground either by its wheels or by said platform, an orientating gear between said platform and said main body, a power unit arranged near the rear end of the main body and including an output shaft directed toward said main body, a working equipment arranged near the front end of the main body, a pair of side control assemblies arranged in parallel relationship and each made up of a clutch and a brake, transmission means connecting said output shaft to each of the control assemblies, a side output shaft associated with each control assembly, transmission means between said output shaft and the wheels situated on the same side of the machine, and a selectively engageable branched connection interposed between each output shaft and the orientating gear.

9. A machine for public works having wheels fitted with pneumatic tires according to claim 8 in which each transmission means provided with an output shaft and the wheels situated on the same side of the machine includes a pair of bevel gears and a pair of spur gears, the last gear of said pair of spur gears being fitted upon the axis of the hinge of the arms upon the main body, and chains arranged in said arms.

10. A machine for public works having wheels fitted with pneumatic tires according to claim 8 in which each selectively engageable branched connection includes a set of bevel gears made up of a first gear and a second gear, a transmission shaft permanently connected to said output shaft, the first gear of said set being mounted idly on said transmission shaft while the second gear of said set is permanently connected to the orientating gear, and means for angularly locking said first gear of the bevel gear set with respect to said transmission shaft for performing proper orientation as the machine rests upon the ground by its platform.

11. A machine for public works having wheels fitted with pneumatic tires comprising a main body, a pair of arms hinged to said main body on each of its sides, the machine wheels being mounted upon said arms, an H-shaped platform arranged under the main body, jacks between said arms and said main body, a fluid circuit for simultaneously controlling said jacks to cause the machine to rest upon the ground selectively either by said platform or by said wheels, an orientating gear between said platform and said main body, a power unit arranged near the rear end of the main body and including an output shaft directed toward the main body, a working equipment arranged near the front end of the main body, a pair of side control assemblies arranged in parallel relationship and each made up of a clutch and a brake, transmission means connecting said output shaft to each control assembly, a side output shaft associated with each control assembly, a set of bevel gears and a set of spur gears interposed between each output shaft and the machine arms arranged on the corresponding side of the main body, the last gear of each set of spur gears being mounted upon the pivotal axis of the arms on the main body, sprocket chain transmissions in said arms between said last gear of each set of spur gears and the wheels, a transmission shaft permanently connected to said output shaft of each control assembly, a pair of bevel gears including a first gear and a second gear, said first gear being mounted idly on said transmission shaft while said second gear is permanently connected to the orientating gear, and means connected to said jack-operating fluid circuit for ensuring joint angular relation between said first gear with said transmission shaft when said fluid circuit controls the jacks for lifting said arms, the machine then resting upon the ground by its platform.

12. A machine for public works having wheels provided with pneumatic tires, comprising a main body having two longitudinal sides, a pair of arms hinged to each longitudinal side of said body, the machine wheels being mounted upon said arms, a platform extending under said main body, means providing a pivotal relationship between said platform and said main body, means for displacing said arms in vertical planes so that the machine may rest upon the ground either by its wheels or by said platform, a power unit mounted rearwardly of the main body, a working equipment mounted at the front end of said main body, a pair of power transmission assemblies mounted in parallel relationship between said power unit and the wheels mounted on each pair of arms, means provided in each of said power transmission assemblies for selectively engaging the same so as to drive said wheels, and means operable when the machine rests upon the ground by said platform for connecting said transmission assemblies to said means providing a pivotal relationship between said platform and said main body for orienting said body and said working equipment with respect to said platform.

References Cited in the file of this patent
UNITED STATES PATENTS

| | | |
|---|---|---|
| 2,259,200 | Cameron et al. | Oct. 14, 1941 |
| 2,357,517 | Burdick et al. | Sept. 5, 1944 |
| 2,610,048 | Lindgren | Sept. 9, 1952 |
| 2,901,051 | Thibodeau | Aug. 25, 1959 |